(12) United States Patent
Shanmugam

(10) Patent No.: US 9,871,848 B1
(45) Date of Patent: Jan. 16, 2018

(54) INTEGRATION ENGINE FOR COMMUNICATIONS BETWEEN SOURCE AND TARGET APPLICATIONS

(71) Applicant: EMC Corporation, Hopkinton, MA (US)

(72) Inventor: Karunanithi Shanmugam, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 711 days.

(21) Appl. No.: 14/040,826

(22) Filed: Sep. 30, 2013

(51) Int. Cl.
*G06F 15/16* (2006.01)
*H04L 29/08* (2006.01)

(52) U.S. Cl.
CPC .................. *H04L 67/10* (2013.01)

(58) Field of Classification Search
CPC ........................................ H04L 29/08
See application file for complete search history.

(56) References Cited

U.S. PATENT DOCUMENTS

| | | | | |
|---|---|---|---|---|
| 5,524,253 A * | 6/1996 | Pham | ......... | G06F 9/46 703/27 |
| 8,081,572 B1 * | 12/2011 | Carney | ......... | H04L 47/6275 370/236 |
| 2004/0249911 A1 * | 12/2004 | Alkhatib | ......... | G06Q 10/109 709/223 |
| 2006/0168349 A1 * | 7/2006 | Van Geest | ......... | G06F 17/30905 709/247 |
| 2009/0150527 A1 * | 6/2009 | Tripathi | ......... | H04L 45/586 709/221 |
| 2014/0067567 A1 * | 3/2014 | Cooke | ......... | G06Q 20/18 705/21 |

OTHER PUBLICATIONS https://web.archive.org/web/20150906021943/http://www.enterpriseintegrationpatterns.com/patterns/messaging/StoreInLibrary.html, Gregor Hohpe, Messaging Patterns, May 1, 2015 (Referenced to book published 2004), Creative Common Attributions.*

(Continued)

*Primary Examiner* — Frantz Jean
(74) *Attorney, Agent, or Firm* — Ryan, Mason & Lewis, LLP

(57) ABSTRACT

An integration engine is provided for communications between source and target applications. A message is sent from a source application to a target application, by processing a header element to route the message to the target application; transforming a message format of the message to a different message format; storing the message payload using a Claim-Check Enterprise Application Integration (EAI) pattern; and providing the transformed message to the target application. Transport adapters optionally transform a message format of the message to a different message format, such as a message format of the source application being transformed to a message format of the target application. The header element is optionally updated using a channel interceptor to update a next endpoint in a flow based on one or more business rules applied to the message payload. The header element can be processed by a header-based router that routes the message to a next endpoint in a flow. The exemplary integration engine is based on a Spring Integration Framework.

20 Claims, 6 Drawing Sheets

(56) References Cited

OTHER PUBLICATIONS https://web.archive.org/web/20040213072659/http://enterpriseintegrationpatterns.com/books1.html, Gregor Hohpe, Enterprise Intergration Patterns, Feb. 13, 2004, Addison-Wesley, (Used for publishing date).*

Eugene Kharlamov, Improving application efficiency with the Claim Check pattern in WebSphere Integration Developer V6.2.0.1; Mar. 3, 2013, IBM.*

Rettig, Michael J., "Asynchronous Implementation with TIBCO ActiveEnterprise", downloaded on Jan. 17, 2014 from http://www.eaipatterns.com/composedMessagingTIBCO.html.

"IBM Integration Bus and WebSphere Message Broker", downloaded on Jan. 17, 2014 from http://www.ibm.com/developerworks/websphere/zones/businessintegration/wmb.html.

* cited by examiner

INTEGRATION ENGINE FOR COMMUNICATIONS BETWEEN SOURCE AND TARGET APPLICATIONS

FIELD

The field relates generally to the integration of systems and applications across an enterprise.

BACKGROUND

Enterprise Application Integration (EAI) is an integration framework comprising a plurality of technologies and services that form middleware to enable integration of systems and applications across an enterprise. Various enterprise applications, such as Customer Relationship Management (CRM) applications and supply chain management applications, typically cannot readily communicate with one another in order to share information, such as data and business rules. This lack of communication leads to inefficiencies, such as identical data being stored in multiple locations, or processes being unable to be automated.

An Integration Framework, such as EAI, can link such applications within a single organization together in order to improve the efficiency and inter-operability of business processes, while avoiding the need for significant changes to existing applications and/or data structures. While such integration solutions have improved the ability of various enterprise applications to communicate with one another, they suffer from a number of limitations, which if overcome, could further improve the efficiency and inter-operability of such business processes. For example, a need remains for an integration framework that provides element based routing, integration of applications in any platform and dynamic configuration of both communication channels and endpoints.

SUMMARY

Illustrative embodiments of the present invention provide an integration engine for communications between source and target applications. In one exemplary embodiment, a message is sent from a source application to a target application, wherein the message comprises a message payload and a header element comprising routing information, the method comprising processing the header element to route the message to the target application; transforming a message format of the message to a different message format; storing the message payload using a Claim-Check Enterprise Application Integration (EAI) pattern; and providing the transformed message to the target application.

According to one aspect of the invention, one or more transport adapters transform a message format of the message to a different message format. For example, a message format of the source application can be transformed to a message format of the target application. In various embodiments, the message format of the message comprises one or more of Java Message Services (JMS), Hypertext Transfer Protocol (http), File Transfer Protocol (FTP), Transmission Control Protocol (TCP), Remote Method Invocation (RMI), Internet Interoperable Protocol (IIOP) and a User Datagram Protocol (UDP).

According to a further aspect of the invention, the header element can be updated using a channel interceptor. In this manner, the channel interceptor can optionally update a next endpoint in a flow based on one or more business rules applied to the message payload. The header element can be processed by a header-based router that routes the message to a next endpoint in a flow.

In one exemplary embodiment, the disclosed integration engine is based on a Spring Integration Framework.

Advantageously, illustrative embodiments of the invention provide an improved integration engine for communications between source and target applications. Application integration in accordance with various aspects of the present invention provides element based routing, integration of applications in any platform and dynamic configuration of both communication channels and endpoints. These and other features and advantages of the present invention will become more readily apparent from the accompanying drawings and the following detailed description.

DETAILED DESCRIPTION

Illustrative embodiments of the present invention will be described herein with reference to exemplary processing devices. It is to be appreciated, however, that the invention is not restricted to use with the particular illustrative integration engine and device configurations shown. Accordingly, the term "integration engine" as used herein is intended to be broadly construed, so as to encompass, for example, various types of integration engines implemented using one or more processing devices.

Aspects of the invention provide an integration engine that integrates distributed applications through a mediation/work flow. The distributed applications can interact with the disclosed integration engine through any supported transport such as Java Message Services (JMS), Hypertext Transfer Protocol (http), or File Transfer Protocol (FTP) using appropriate inbound and outbound adapters and channels.

Figure 1:
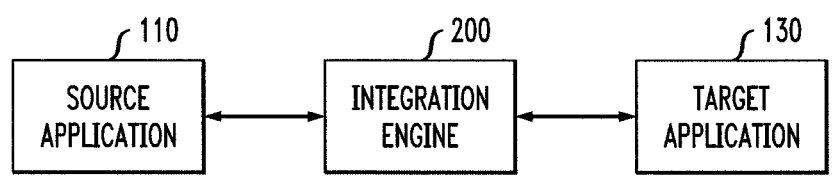
FIG. 1. Illustrates an exemplary network environment in which the present invention can operate.

FIG. 1. illustrates an exemplary network environment 100 in which the present invention can operate. As shown in FIG. 1, the exemplary integration engine 200, as discussed further below in conjunction with FIG. 2, enables communications between a source application 110 and a target application 130. As discussed further below, the exemplary integration engine 200 comprises an administration console portal application.

Figure 2:
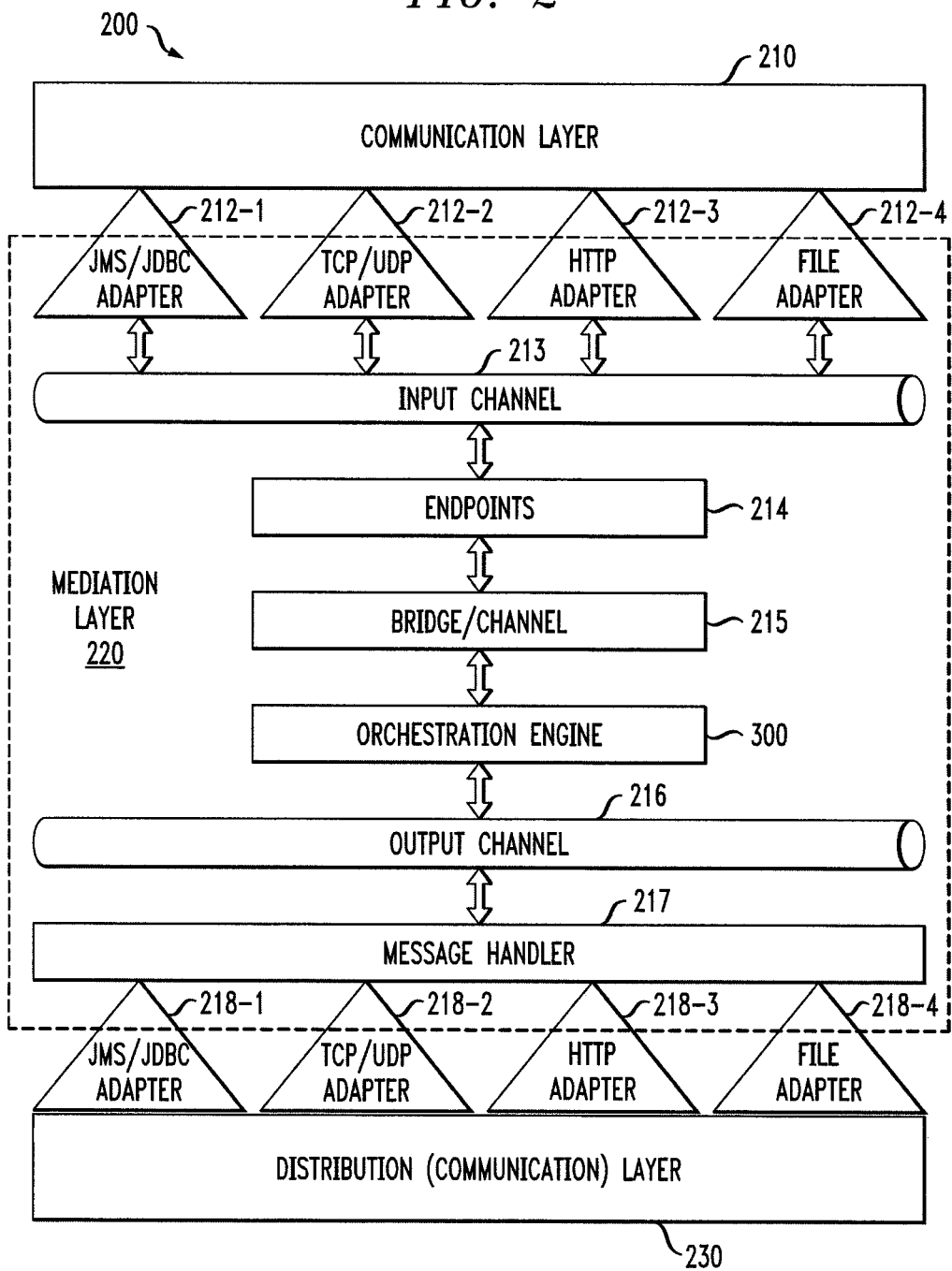
FIG. 2 illustrates an exemplary architecture for the exemplary integration engine.

FIG. 2 illustrates an exemplary architecture for the exemplary integration engine 200. As shown in FIG. 2, the exemplary architecture of the integration engine 200 comprises a communication layer 210, a mediation layer 220 and a distribution layer 230, which is also referred to as a communication layer.

The exemplary communication layer 210 comprises protocols for any source application 110 to communicate with the integration engine 200. For example, an exemplary implementation supports Java Message Services (JMS), Hypertext Transfer Protocol (http), File Transfer Protocol (FTP), Transmission Control Protocol (TCP), Remote Method Invocation (RMI), Internet Interoperable Protocol (IIOP) and User Datagram Protocol (UDP) using appropriate inbound and outbound adapters and channels, discussed below.

The exemplary mediation layer 220 processes an input message of any supported protocol of the communication layer 210. As shown in FIG. 2, each supported protocol will have a corresponding inbound adapter, such as exemplary adapters 212-1 through 212-4 (for JMS/Data Bus Control (DBC); TCP/UDP; HTTP and FTP, respectively), in order to put forth the incoming message to an input channel 213 from where each endpoint 214 can process the message and send the output messages to the Distribution Layer 230 using an output channel 216, message handler 217 and outbound adaptor, such as exemplary adapters 218-1 through 218-4. Some of the commonly used endpoints 214 comprise, for example, a Service Activator, Splitter and Aggregator, Router, Transformer and claim Check-in and claim-out transformers.

As shown in FIG. 2, the mediation layer 220 further comprises a bridge/channel 215 for linking one or more endpoints 214 with an orchestration engine 300, discussed further below in conjunction with FIG. 3.

The exemplary distribution layer 230 is another kind of communication layer through which the output message will reach the target application 130 using any of the transports such as HTTP, JMS, FTP, Transmission Control Protocol (TCP) and User Datagram Protocol (UDP) using the respective adapters and gateways.

In this manner, the transport adapters 212, 218 in any message flow can change the message format of the source application 110 into a message format of the target application 130.

Figure 3:
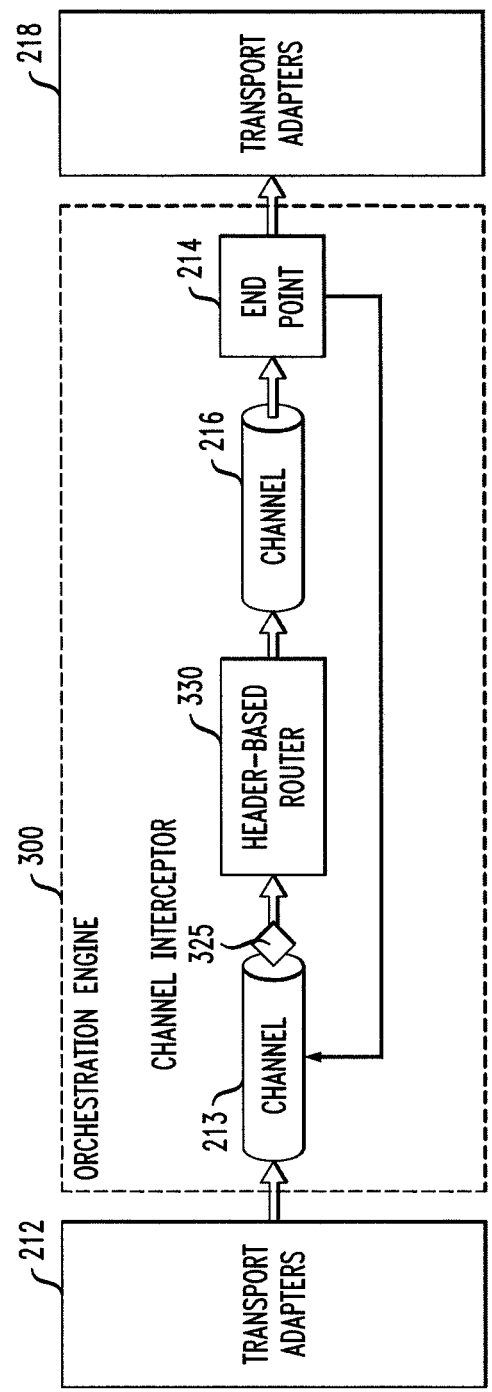
FIG. 3 illustrates an exemplary logical architecture of the integration engine of FIG. 2 in further detail.

FIG. 3 illustrates an exemplary logical architecture of the integration engine 200 of FIG. 2 comprising the inbound transport adapters 212, orchestration engine 300 and outbound transport adapters 218 of FIG. 2 in further detail. As indicated above, the exemplary inbound transport adapters 212 comprise adapters to various transports or protocols through which the source application 110 can send the message or interaction with the orchestration engine 300. The various exemplary transports supported are HTTP, JMS, FTP, Advanced Message Queue Protocol (AMQP), Java Database Connectivity (JDBC), and Remote Method Invocation (RMI). The exemplary inbound transport adapters 212 will put the input message or invocation parameters into the input channel 213 of the orchestration engine 300.

For a more detailed discussion of exemplary transport adapters supported by an exemplary Spring Integration Framework, see for example, http://docs.spring.io/spring-integration/docs/3.0.0.0.BUILD-SNAPSHOT/reference/html/amqp.html, incorporated by reference herein.

The exemplary orchestration engine 300 processes each message according to the specified configuration. As shown in FIG. 3, the exemplary orchestration engine 300 comprises an input channel 213 with channel interceptors 325, a header-based router 330, an output channel 216 and integration endpoints 214 that are provided by the exemplary Spring Integration Framework. Various endpoints of the framework comprise, for example, transformers, splitter, aggregator, service activator, service gateways, and filters.

The header-based routing performed by header-based router 330 enables the end user to easily modify their workflow or process flow through configuration changes. Each channel in the mediation flow will have a channel interceptor 325 that will update the header element of the message based on the header element. The header-based router 330 will route the message to the next endpoint 214 in the flow. The channel interceptor 325 can also change the next endpoint 214 based on the result of applying one or more business rules on the message payload in the flow.

In this manner, intermediate nodes can be dynamically determined by evaluating the message header. Any intermediate node can change the header value based on a value of the message and application of business rules on the message payloads.

The exemplary outbound transport adapters 218 comprise adapters to various supported transports or protocols through which the target application 130 can receive message or invocation from the source application 110 through the orchestration engine 300. The various exemplary transports supported in one embodiment are HTTP, JMS, FTP, AMQP, JDBC and RMI. These adapters 218 provide the required output message or result to the target application 130 from the output channel 216 of the orchestration engine 300.

In one exemplary implementation, a source application 110 sends a message to a target application 130 using a Claim-Check EAI pattern to store the message payload, which reduces the data volume of a transmitted message without sacrificing information content. In this manner, very large messages can be sent from a source application 110 to a target application 130. See for example, http://eaipatterns.com/StoreInLibrary.html, incorporated by reference herein.

Figure 4:
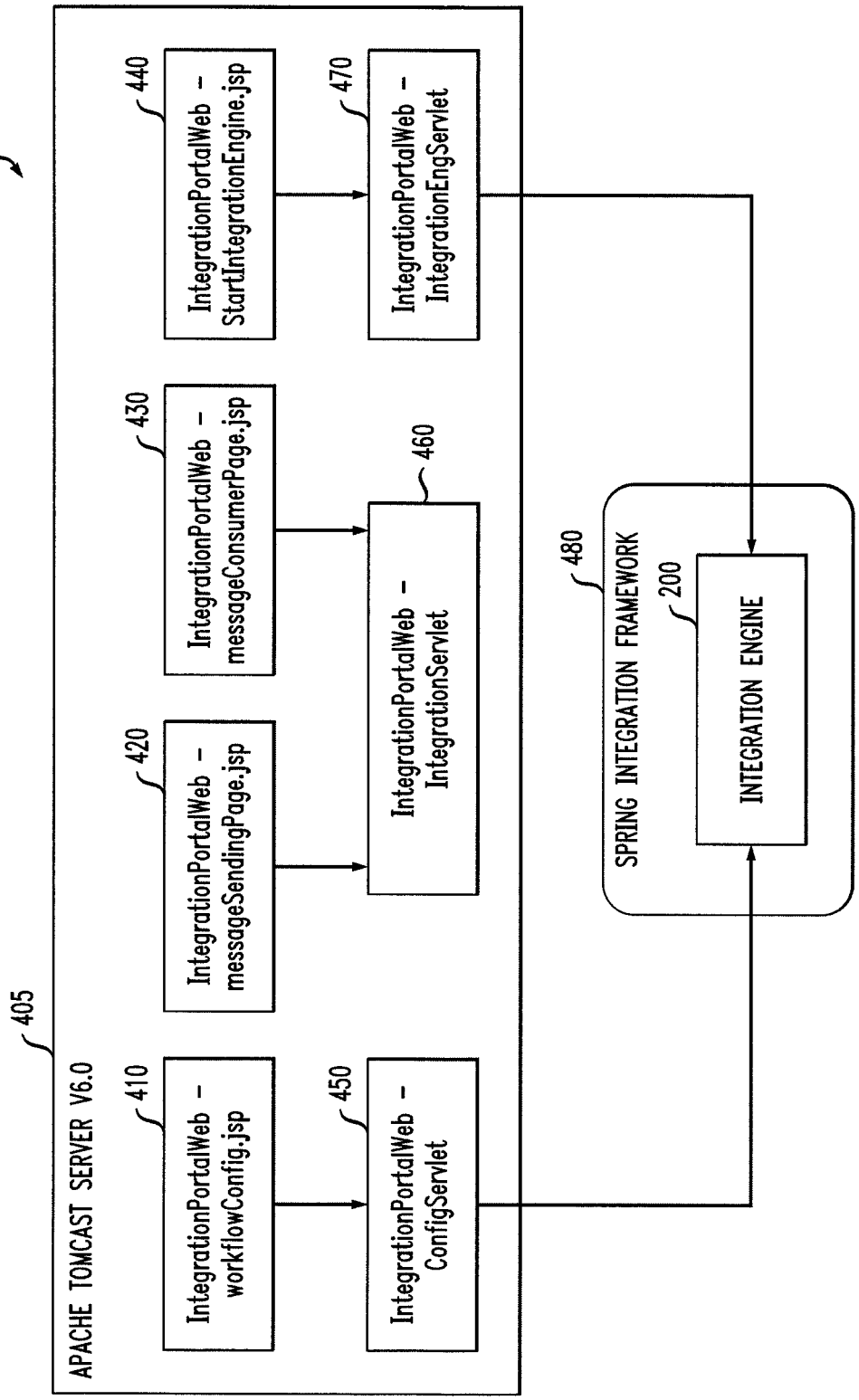
FIG. 4 illustrates an exemplary implementation of an exemplary integration engine having an integration engine administration console—portal application.

FIG. 4 illustrates an exemplary implementation of an exemplary integration engine 400 having an integration engine administration console—portal application 405. The exemplary integration engine portal application 405 is a web based application that can be used as an administration console for the integration engine 200. The application 405 is developed to control and administer the integration engine 200 as well to configure any workflow or business process flow in order to integrate any set of applications to communicate with each other.

As shown in FIG. 4, the exemplary integration engine portal application 405 comprises a workflow configuration page 410 (IntegrationPortalWeb—workflowConfig.jsp). The exemplary integration engine 200 is configured and controlled by the exemplary integration engine portal application 405 deployed on an Apache Tomcat Server V6.0. The workflow configuration page 410 is a java server page component used to configure any workflow or process flow for integration or mediation between any set of applications 110, 130.

An exemplary configuration servlet 450 (IntegrationPortalWeb—ConfigServlet) is used to process the configuration details entered in the workflowConfig.jsp page 410 by selecting endpoints 214 to be used in order to process the message and send the output to distribution layer 230.

An exemplary integration servlet 460 (IntegrationPortalWeb—IntegrationServlet) is used to post messages to the integration engine 200 using, for example, JMS/HTTP/FTP transport for processing and also to receive the processed message through outbound adapter 218 in the distribution layer 230 using the web pages messageSendingPage.jsp, messageConsumerPage.jsp respectively.

An exemplary message sending page 420 (IntegrationPortalWeb—messageSendingPage.jsp) is a java server page component that is used to send or post any type of message with any kind of payload such as text or file.

An exemplary message consumer page 430 (IntegrationPortalWeb—messageConsumerPage.jsp) is a java server page component which is used to receive the outbound message from the integration engine after the input message got processed by the integration engine received through any kind of outbound adapters.

An exemplary integration engine sevlet 470 (IntegrationPortalWeb—IntegrationEngSevlet) is responsible for starting and stopping the exemplary integration engine 200 through a StartlntegrationEngine.jsp page 440.

As shown in FIG. 4, the exemplary exemplary integration engine 200 is a core component running in one embodiment on a Spring Integration Framework 480 using built-in endpoints 214 such as a Splitter, Router, Transformer, and Inbound & Outbound adapters.

An exemplary EngineConfig.xml file can be used as a Spring Integration Configuration file that is used to configure any endpoints 214 built-in Spring Integration Framework. An endpoints.properties file can configure the work flow through IntegationPortalWeb Application 405. The endpoints.properties file can be read using a PropertyPlaceHolderConfigurer spring component dynamically. The jdbc.properties file has been used to configure the message store using jdbc data source component.

An exemplary IntegrationEngineStart java component can be used to start the exemplary integration engine 200 by creating the ApplicationContext by loading EngineConfig.xml (Spring Integration Configuration file) in the java virtual machine and also used to start the Event Consumer component of Spring Integration framework that has been used to listen to various channels to trace the work flow.

Among other benefits, an implementation based on the exemplary Spring Integration Framework provides an open source framework. The exemplary Spring Integration Framework is a light weight framework that can run, for example, on an Apache tomcat server. An exemplary tcServer has an Elastic Memory for Java (EM4J) balloon driver. Thus, each tcServer instance in the tcServer cluster can increase its heap memory beyond its threshold by using the heap memory in the other tcServer instance or decrease the memory on demand.

Figure 5:
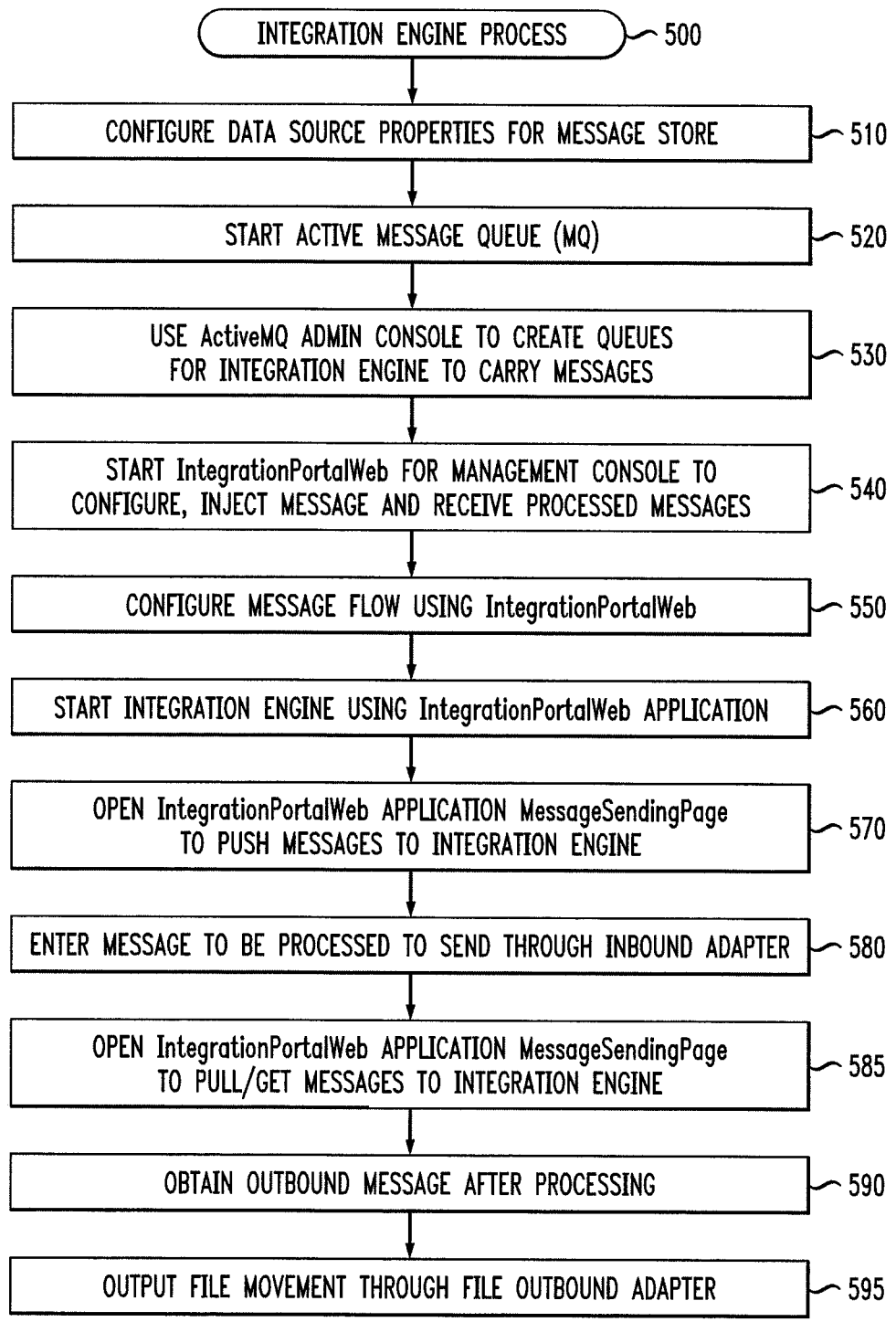
FIG. 5 is a flow chart describing an exemplary integration engine process incorporating aspects of the present invention.

FIG. 5 is a flow chart describing an exemplary integration engine process 500 incorporating aspects of the present invention. As shown in FIG. 5, the exemplary integration engine process 500 initially configures the data source properties for the message store (e.g., claim-in pattern) during step 510, to enable the storage of large messages that can be retrieved.

During step 520, the exemplary integration engine process 500 starts the active message queue (MQ) to open a communication channel (e.g., a JMS channel). The active message queue administration console is then used during step 530 to create queues for the exemplary integration engine 200 to carry messages. The integration engine portal application 405 (integrationportalweb) is initiated during step 540 for the management console to configure and inject messages and to receive processed messages.

The message flow is configured during step 550 using integration engine portal application 405 (integrationportalweb). The exemplary integration engine 200 is started during step 560 using the integration engine portal application 405 (integrationportalweb).

The exemplary message sending page 420 (IntegrationPortalWeb—messageSendingPagejsp) is opened during step 585 to push messages to the exemplary integration engine 200. The message to be processed is entered during step 580 to send the message through inbound adapters 212.

The exemplary message sending page 420 (IntegrationPortalWeb—messageSendingPagejsp) is opened during step 570 to pull/get messages to the exemplary integration engine 200. Outbound message are obtained during step 590 after processing. Finally, the file is output through the outbound adapter 218 during step 595.

Among other benefits, the disclosed integration engine integrates distributed applications through a mediation/work flow. The distributed applications can interact with the disclosed integration engine through any supported transport such as Java Message Services (JMS), Hypertext Transfer Protocol (http), or File Transfer Protocol (FTP) using appropriate inbound and outbound adapters and channels.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 6:
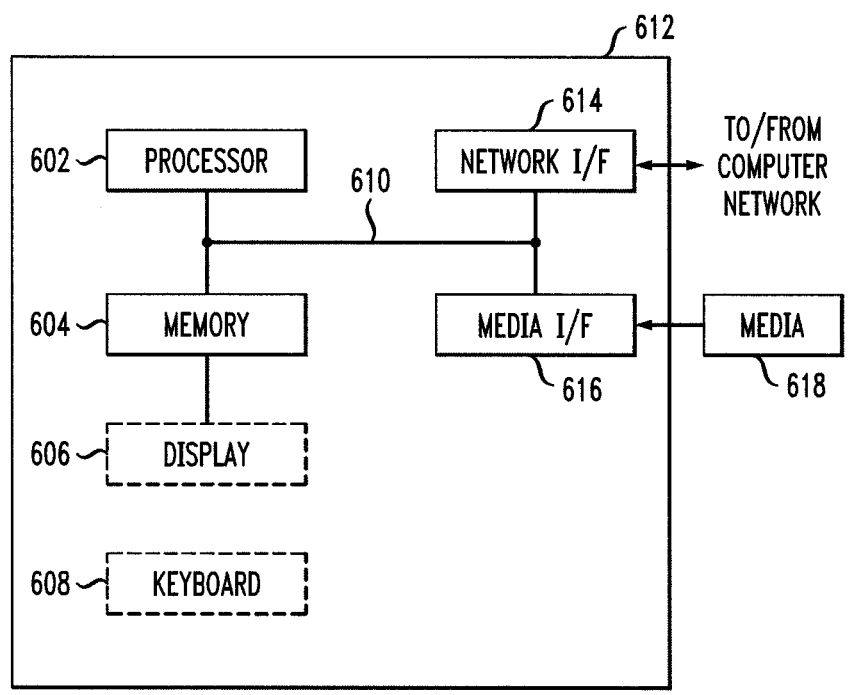
FIG. 6 is a system diagram of an exemplary computer system on which at least one embodiment of the invention can be implemented.

By way of example, an aspect of the present invention can make use of software running on a general purpose computer. FIG. 6 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from fraud detection techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method for sending a message from a source application to a target application, said message comprising a message payload and a header element comprising routing information, said method comprising:
   processing said header element, using at least one processing device of an integration engine, to route said message to said target application;
   transforming, using said at least one processing device of said integration engine, a message format of said message to a different message format to change a message format of said source application to a message format of said target application;
   storing, using said at least one processing device of said integration engine, said message payload using a claim-Check Enterprise Application Integration (EAI) pattern;
   applying, using said at least one processing device of said integration engine, one or more business rules to said message payload to dynamically change a next endpoint in said header element for said message; and
   providing, using said at least one processing device of said integration engine, said transformed message to said target application.

2. The method of claim 1 wherein said step of storing said message payload using said claim-Check EAI pattern reduces a data volume of said message.

3. The method of claim 1 wherein said step of transforming a message format of said message to a different message format employs one or more transport adapters.

4. The method of claim 3 wherein said message format of said message comprises one or more of Java Message Services (JMS), Hypertext Transfer Protocol (http), File Transfer Protocol (FTP), Transmission Control Protocol (TCP), Remote Method Invocation (RMI), Internet Interoperable Protocol (HOP) and User Datagram Protocol (UDP).

5. The method of claim 1 further comprising the step of updating said routing information of said header element using a channel interceptor.

6. The method of claim 5 wherein said channel interceptor updates said next endpoint of said routing information in said flow based on said one or more business rules applied to said message payload.

7. The method of claim 1 wherein said header element is processed by a header-based router that routes said message to a next endpoint in a flow.

8. The method of claim 1 wherein said method is implemented by an integration engine based on a Spring Integration Framework.

9. A computer program product for sending a message from a source application to a target application, said message comprising a message payload and a header element comprising routing information, said computer program product comprising a non-transitory machine-readable storage medium having encoded therein executable code of one or more software programs, wherein the one or more software programs when executed perform the following steps:
   processing said header element, using at least one processing device of an integration engine, to route said message to said target application;
   transforming, using said at least one processing device of said integration engine, a message format of said message to a different message format to change a message format of said source application to a message format of said target application;
   storing, using said at least one processing device of said integration engine, said message payload using a claim-Check Enterprise Application Integration (EAI) pattern;
   applying, using said at least one processing device of said integration engine, one or more business rules to said message payload to dynamically change a next endpoint in said header element for said message; and
   providing, using said at least one processing device of said integration engine, said transformed message to said target application.

10. The computer program product of claim 9 wherein said step of storing said message payload using said claim-Check EAI pattern reduces a data volume of said message.

11. The computer program product of claim 10 wherein said channel interceptor updates said next endpoint of said routing information in said flow based on said one or more business rules applied to said message payload.

12. The computer program product of claim 9 further comprising the step of updating said routing information of said header element using a channel interceptor.

13. An integration engine system for sending a message from a source application to a target application, said message comprising a message payload and a header element comprising routing information, comprising:

a memory; and at least one processing device, coupled to the memory, operative to implement the following steps:

process said header element, using said at least one processing device of an integration engine, to route said message to said target application;

transform, using said at least one processing device of said integration engine, a message format of said message to a different message format to change a message format of said source application to a message format of said target application;

store, using said at least one processing device of said integration engine, said message payload using a claim-Check Enterprise Application Integration (EAI) pattern;

apply, using said at least one processing device of said integration engine, one or more business rules to said message payload to dynamically change a next endpoint in said header element for said message; and provide, using said at least one processing device of said integration engine, said transformed message to said target application.

14. The integration engine system of claim 13 wherein said message payload is stored using said claim-Check EAI pattern that reduces a data volume of said message.

15. The integration engine system of claim 13 further comprising one or more transport adapters for transforming said message format of said message to a different message format for said target application.

16. The integration engine system of claim 15 wherein said message format of said message comprises one or more of Java Message Services (JMS), Hypertext Transfer Protocol (http), File Transfer Protocol (FTP), Transmission Control Protocol (TCP), Remote System Invocation (RMI), Internet Interoperable Protocol (IIOP) and User Datagram Protocol (UDP).

17. The integration engine system of claim 13 further comprising a channel interceptor to update said routing information of said header element.

18. The integration engine system of claim 17 wherein said channel interceptor updates said next endpoint of said routing information in said flow based on said one or more business rules applied to said message payload.

19. The integration engine system of claim 13 further comprising a header-based router to process said header element to route said message to a next endpoint in a flow.

20. The integration engine system of claim 13 wherein said integration engine system is based on a Spring Integration Framework.

* * * * *